US012306399B2

(12) United States Patent
Wang et al.

(10) Patent No.: US 12,306,399 B2
(45) Date of Patent: May 20, 2025

(54) SYSTEM AND METHOD FOR DRIVING A TWO-AXIS SCANNING MIRROR USING DRIVERS OF DIFFERENT TYPES

(71) Applicant: BEIJING VOYAGER TECHNOLOGY CO., LTD., Beijing (CN)

(72) Inventors: Youmin Wang, Berkeley, CA (US); Yufeng Wang, Mountain View, CA (US); Gary Li, Mountain View, CA (US)

(73) Assignee: BEIJING VOYAGER TECHNOLOGY CO., LTD., Beijing (CN)

( * ) Notice: Subject to any disclaimer, the term of this patent is extended or adjusted under 35 U.S.C. 154(b) by 562 days.

(21) Appl. No.: 17/172,047

(22) Filed: Feb. 9, 2021

(65) Prior Publication Data

US 2022/0252867 A1    Aug. 11, 2022

(51) Int. Cl.
| | |
|---|---|
| G02B 26/08 | (2006.01) |
| G01S 7/481 | (2006.01) |
| G02B 26/10 | (2006.01) |
| G01S 17/894 | (2020.01) |
| G01S 17/931 | (2020.01) |

(52) U.S. Cl.
CPC .......... *G02B 26/101* (2013.01); *G01S 7/4817* (2013.01); *G02B 26/0841* (2013.01); *G02B 26/0858* (2013.01); *G01S 17/894* (2020.01); *G01S 17/931* (2020.01)

(58) Field of Classification Search
None
See application file for complete search history.

(56) References Cited

U.S. PATENT DOCUMENTS

| | | | |
|---|---|---|---|
| 2010/0232833 A1 | 9/2010 | Fujii et al. | |
| 2011/0194164 A1 | 8/2011 | Chou et al. | |
| 2014/0320944 A1 | 10/2014 | Lubianiker et al. | |
| 2014/0355091 A1 | 12/2014 | Mizutani | |
| 2015/0286048 A1 | 10/2015 | Chen et al. | |
| 2019/0243126 A1* | 8/2019 | Liukku | G02B 26/101 |
| 2023/0176361 A1* | 6/2023 | Hishinuma | G02B 26/0858 |
| | | | 359/199.1 |

OTHER PUBLICATIONS

International Search Report issued in corresponding International Application No. PCT/CN2021/061964, mailed Apr. 12, 2022, 3 pages.
Written Opinion of the International Searching Authority issued in corresponding International Application No. PCT/CN2021/061964, mailed Apr. 12, 2022, 4 pages.

* cited by examiner

*Primary Examiner* — Euncha P Cherry
(74) *Attorney, Agent, or Firm* — Bayes PLLC

(57) ABSTRACT

Embodiments of the disclosure provide a scanner for steering optical beams. In certain configurations, the scanner may include a scanning mirror independently rotatable around a first axis and a second axis. In certain other configurations, the scanner may also include a first driver configured to drive the scanning mirror to rotate around the first axis. In still other configurations, the scanner may further include a second driver configured to drive the scanning mirror to simultaneously rotate around the second axis. In certain aspects, the first driver and the second driver may be different types of drivers.

17 Claims, 8 Drawing Sheets

235

245

108

Second Axis
203

(Second Direction)

300

SYSTEM AND METHOD FOR DRIVING A TWO-AXIS SCANNING MIRROR USING DRIVERS OF DIFFERENT TYPES

TECHNICAL FIELD

The present disclosure relates to drivers used to rotate a two-axis scanning mirror of an optical sensing system, and more particularly to, a first driver (e.g., electrostatic) configured to drive the scanning mirror to rotate around the first axis and a second driver (e.g., piezoelectric) configured to drive the scanning mirror to simultaneously rotate around the second axis.

BACKGROUND

Optical sensing systems, e.g., such as LiDAR systems, have been widely used in advanced navigation technologies, such as to aid autonomous driving or to generate high-definition maps. For example, a typical LiDAR system measures the distance to a target by illuminating the target with pulsed laser light beams and measuring the reflected pulses with a sensor. Differences in laser light return times, wavelengths, and/or phases can then be used to construct digital three-dimensional (3D) representations of the target. Because using a narrow laser beam as the incident light can map physical features with very high resolution, a LiDAR system is particularly suitable for applications such as sensing in autonomous driving and high-definition map surveys.

To scan the narrow laser beam across a broad field-of-view (FOV) in two-dimension (2D), a scanning mirror has to be able to rotate back and forth about two different axes to scan the surrounding environment. Conventionally, 2D scanning is implemented by mounting two separate one-axis scanning mirrors on separate actuators to rotate around the respective axes. Rotation about one axis provides a fast sweep of the surrounding environment and the other axis provides a slow sweep to construct a digital 3D image of the far-field. The slow axis is typically implemented by using mechanical actuator (e.g., a galvanometer) and the fast axis can be implemented by a mechanical or solid-state actuator. The galvanometer may be configured to drive the scanning mirror to rotate about one axis (e.g., slow-sweep), and electrostatic drive combs drive the scanning mirror to rotate about the other axis (e.g., fast-sweep). Galvanometers designed for beam steering applications can have frequency responses up to 1 kHz.

However, there are several drawbacks in using two one-axis mirrors to implement a two-axis scanning mirror also referred to as a "two-dimensional (2D) mirror") and using a galvanometer to drive the slow sweep in LiDAR systems. For example, the continued demand for further form factor reductions in optical sensing systems may be constrained. Typically, form factor reductions can be achieved by reducing the number and/or size of the elements included in the system. The two one-axis mirrors are typically placed certain distance away from each other to allow the rotation of each mirror and to accommodate the light path, and therefore taking up a certain space in the LiDAR system. Also, as compared with other elements, the galvanometer occupies a disproportionately large area within the system. Due to the mechanism by which it operates, reducing the size of the galvanometer may be difficult if not impossible to achieve. Moreover, galvanometers are expensive and often suffer from mechanical issue related to its moving parts.

Hence, there is an unmet need for an optical sensing system that is configured to scan a laser beam about two different axes without the use of a galvanometer.

SUMMARY

Embodiments of the disclosure provide a scanner for steering optical beams. In certain configurations, the scanner may include a scanning mirror independently rotatable around a first axis and a second axis. In certain configurations, the scanner may also include a first driver configured to drive the scanning mirror to rotate around the first axis. The scanner may further include a second driver configured to drive the scanning mirror to simultaneously rotate around the second axis. In certain aspects, the first driver and the second driver may be different types of drivers.

Embodiments of the disclosure also provide a transmitter for optical sensing systems. In certain configurations, the transmitter may include a light source configured to emit a light beam towards an object. In certain configurations, the transmitter may include a scanner for steering the light beam towards an object. In certain aspects, the scanner may include a scanning mirror independently rotatable around a first axis and a second axis. In certain aspects, the scanner may include a first driver configured to drive the scanning mirror to rotate around the first axis. The scanner may further include a second driver configured to drive the scanning mirror to simultaneously rotate around the second axis. The first driver and the second driver may be different types of drivers.

Embodiments of the disclosure further provide a scanning method of an optical sensing system. In certain configurations, the method may include driving a scanning mirror to oscillate around a first axis using a first driver. In certain configurations, the method may include driving the scanning mirror to simultaneously oscillate around a second axis using a second driver. In certain aspects, the first driver and the second driver may be different types of drivers. In certain aspects, the scanning mirror, the first driver, and the second driver are formed on single crystal silicon.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

LiDAR is an optical sensing technology that enables autonomous vehicles to "see" the surrounding world, creating a virtual model of the environment to facilitate decision-making and navigation. An optical sensor (e.g., LiDAR transmitter and receiver) creates a 3D map of the surrounding environment using laser beams and time-of-flight (ToF) distance measurements. ToF, which is one of LiDAR's operational principles, provides distance information by measuring the travel time of a collimated laser beam to reflect off an object and return to the sensor. Reflected light signals are measured and processed at the vehicle to detect, identify, and decide how to interact with or avoid objects.

Due to the challenges imposed by using two one-axis mirrors to implement a two-axis mirror and using a galvanometer to drive the slow-sweep axis, as discussed in the BACKGROUND section above, the present disclosure provides a scanner with a true 2D scanning mirror that rotates around two axes. It eliminates the need for a galvanometer by including a piezoelectric driver to drive the scanning mirror to rotate about the slow-sweep axis. More specifically, the scanner of the present disclosure includes an electrostatic comb drive to drive the 2D scanning mirror to rotate around a first-axis at a relatively high frequency and a piezoelectric driver that drives the scanning mirror to rotate around a second axis at a relatively low frequency. By eliminating the need for separate mirrors and the galvanometer, the LiDAR system of the present disclosure may be designed with significant reductions in form factor and cost as compared to conventional systems. At the same time, the scanner of the present disclosure steers a laser beam around two axes so that objects in the surrounding environment may be sensed with the degree of accuracy needed for autonomous driving and high-definition map surveys.

Some exemplary embodiments are described below with reference to a scanner used in LiDAR system(s), but the application of the scanning mirror assembly disclosed by the present disclosure is not limited to the LiDAR system. Rather, one of ordinary skill would understand that the following description, embodiments, and techniques may apply to any type of optical sensing system (e.g., biomedical imaging, 3D scanning, tracking and targeting, free-space optical communications (FSOC), and telecommunications, just to name a few) known in the art without departing from the scope of the present disclosure.

Figure 1:
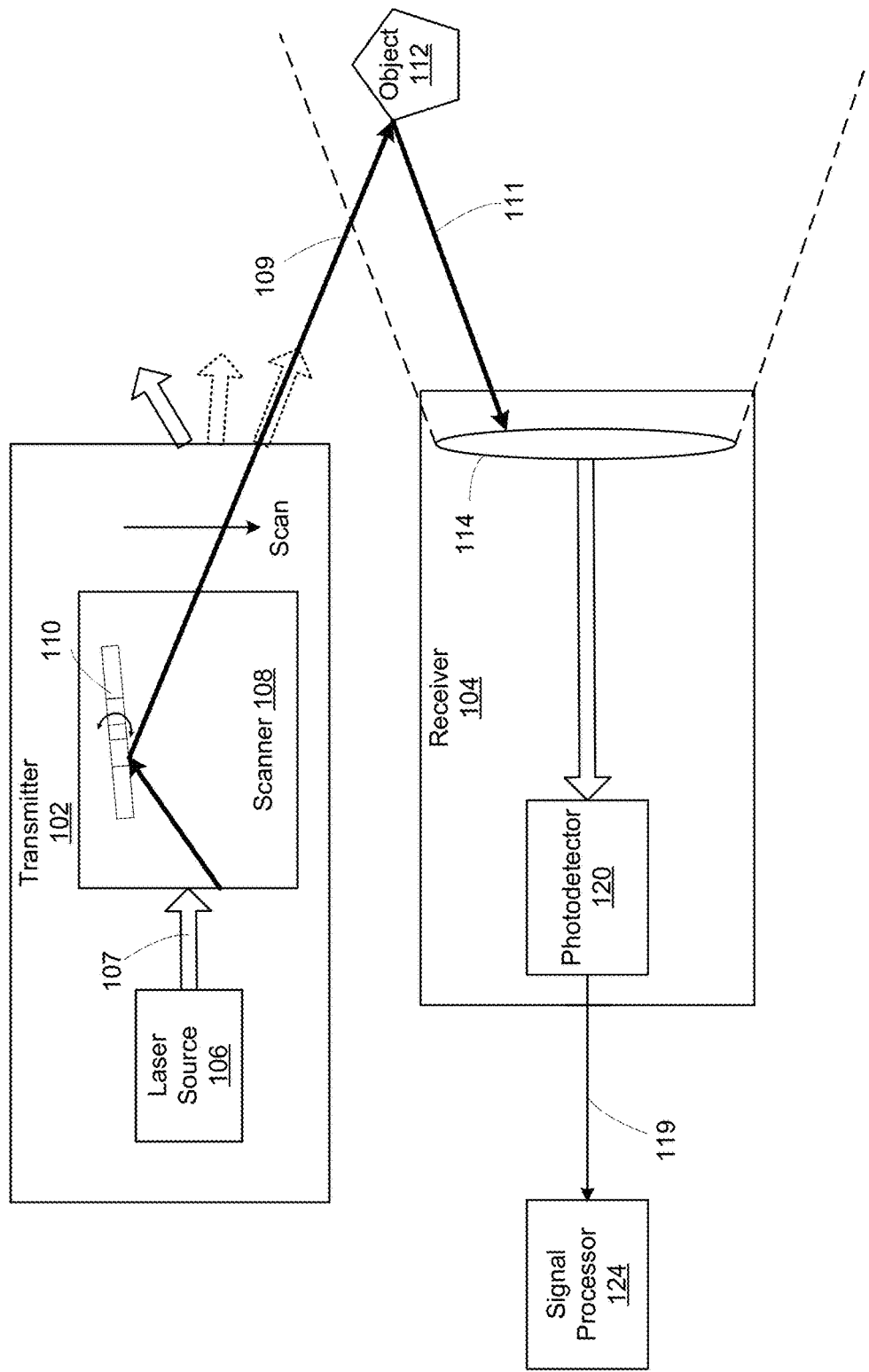
FIG. 1 illustrates a block diagram of an exemplary LiDAR system, according to embodiments of the disclosure.

FIG. 1 illustrates a block diagram of an exemplary LiDAR system 100, according to embodiments of the disclosure. LiDAR system 100 may include a transmitter 102 and a receiver 104. Transmitter 102 may emit laser beams along multiple directions. Transmitter 102 may include one or more laser source(s) 106 and a scanner 108. Scanner 108 of the exemplary LiDAR system 100 eliminates the need for a bulky and expensive galvanometer. Instead, scanner 108 includes a piezoelectric driver to rotate a scanning mirror about the axis associated with the slow-sweep.

Transmitter 102 can sequentially emit a stream of pulsed laser beams in different directions within a scan range (e.g., a range in angular degrees), as illustrated in FIG. 1. Light source 106 may be configured to provide a laser beam 107 (also referred to as "native laser beam") to scanner 108. In some embodiments of the present disclosure, light source 106 may generate a pulsed laser beam in the ultraviolet, visible, or near infrared wavelength range.

In some embodiments of the present disclosure, light source 106 may include a pulsed laser diode (PLD), a vertical-cavity surface-emitting laser (VCSEL), a fiber laser, etc. For example, a PLD may be a semiconductor device similar to a light-emitting diode (LED) in which the laser beam is created at the diode's junction. In some embodiments of the present disclosure, a PLD includes a PIN diode in which the active region is in the intrinsic (I) region, and the carriers (electrons and holes) are pumped into the active region from the N and P regions, respectively. Depending on the semiconductor materials, the wavelength of incident laser beam 107 provided by a PLD may be greater than 700 nm, such as 760 nm, 785 nm, 808 nm, 848 nm, 905 nm, 940 nm, 980 nm, 1064 nm, 1083 nm, 1310 nm, 1370 nm, 1480 nm, 1512 nm, 1550 nm, 1625 nm, 1654 nm, 1877 nm, 1940 nm, 2000 nm, etc. It is understood that any suitable laser source may be used as light source 106 for emitting laser beam 107. In certain configurations, a collimating lens may be positioned between light source 106 and scanner 108 and configured to collimate laser beam 107 prior to impinging on the MEMS mirror 110. MEMS mirror 110, at its rotated angle, may deflect the laser beam 107 generated by laser sources 106 to the desired direction, which becomes collimated laser beam 109.

Scanner 108 may be configured to steer a collimated laser beam 109 towards an object 112 (e.g., stationary objects, moving objects, people, animals, trees, fallen branches, debris, metallic objects, non-metallic objects, rocks, rain, chemical compounds, aerosols, clouds and even single molecules, just to name a few) in a direction within a range of scanning angles. In some embodiments consistent with the present disclosure, scanner 108 may include, among others, a micromachined mirror assembly having a 2D scanning mirror, such as MEMS mirror 110 that is individually rotatable about a first axis and a second axis. In the example(s) set forth below, the first axis (also referred to herein as "x-axis") may be associated with the fast-sweep or a high-frequency oscillation, and the second axis (also referred to herein as the "y-axis") may be associated with the slow-sweep or a low-frequency oscillation.

In some embodiments, at each time point during the scan, scanner 108 may steer light from the light source 106 in a direction within a range of scanning angles by rotating the micromachined mirror assembly concurrently (also referred to herein as "simultaneously") about the first axis and the second axis. The range of scanning angles can be designed based on, among others, the Q-factor of the scanning mirror, the voltages applied to the various drivers, the spring constants, overall system design, etc.

The micromachined mirror assembly may include various components that enable, among other things, the rotation of the MEMS mirror 110 around different axes. For example, the components, e.g., a 2D scanning mirror (e.g., MEMS mirror 110), a first driver of a first type (e.g., electrostatic) configured to rotate the scanning mirror around a first axis, a second driver of a second type (e.g., piezoelectric) configured to rotate the scanning mirror around a second axis, at least one first torsion spring positioned along the first axis and associated with the first driver, at least one second torsion spring positioned along the second axis and associated with the second driver, a plurality of anchors, a gimbal, and/or one or more silicon beams on which the piezoelectric films of the second driver are formed, just to name a few. In certain aspects, one or more of the components of scanner 108 may be formed on a single crystal silicon. For example, the scanning mirror, the first driver, and the second driver, just to name a few, may be formed on a single crystal silicon. Additional details of exemplary scanner 108 are set forth below in connection with FIGS. 2A-3.

Still referring to FIG. 1, in some embodiments, receiver 104 may be configured to detect a returned laser beam 111 returned from object 112. The returned laser beam 111 may be in a different direction from laser beam 109. Receiver 104 can collect laser beams returned from object 112 and output electrical signals reflecting the intensity of the returned laser beams. Upon contact, laser light can be reflected by object 112 via backscattering, e.g., such as Raman scattering and fluorescence. As illustrated in FIG. 1, receiver 104 may include a lens 114 and a photodetector 120. Lens 114 may be configured to collect light from a respective direction in its FOV and converge the laser beam to focus before it is received on photodetector 120. At each time point during the scan, returned laser beam 111 may be collected by lens 114. Returned laser beam 111 may be returned from object 112 and have the same wavelength as laser beam 109.

Photodetector 120 may be configured to detect returned laser beam 111 returned from object 112. In some embodiments, photodetector 120 may convert the laser light (e.g., returned laser beam 111) collected by lens 114 into an electrical signal 119 (e.g., a current or a voltage signal). Electrical signal 119 may be generated when photons are absorbed in a photodiode included in photodetector 120. In some embodiments of the present disclosure, photodetector 120 may include a PIN detector, a PIN detector array, an avalanche photodiode (APD) detector, a APD detector array, a single photon avalanche diode (SPAD) detector, a SPAD detector array, a silicon photo multiplier (SiPM/MPCC) detector, a SiP/MPCC detector array, or the like.

LiDAR system 100 may also include at least one signal processor 124. Signal processor 124 may receive electrical signal 119 generated by photodetector 120. Signal processor 124 may process electrical signal 119 to determine, for example, distance information carried by electrical signal 119. Signal processor 124 may construct a point cloud based on the processed information. Signal processor 124 may include a microprocessor, a microcontroller, a central processing unit (CPU), a graphical processing unit (GPU), a digital signal processor (DSP), or other suitable data processing devices.

Figure 2A:
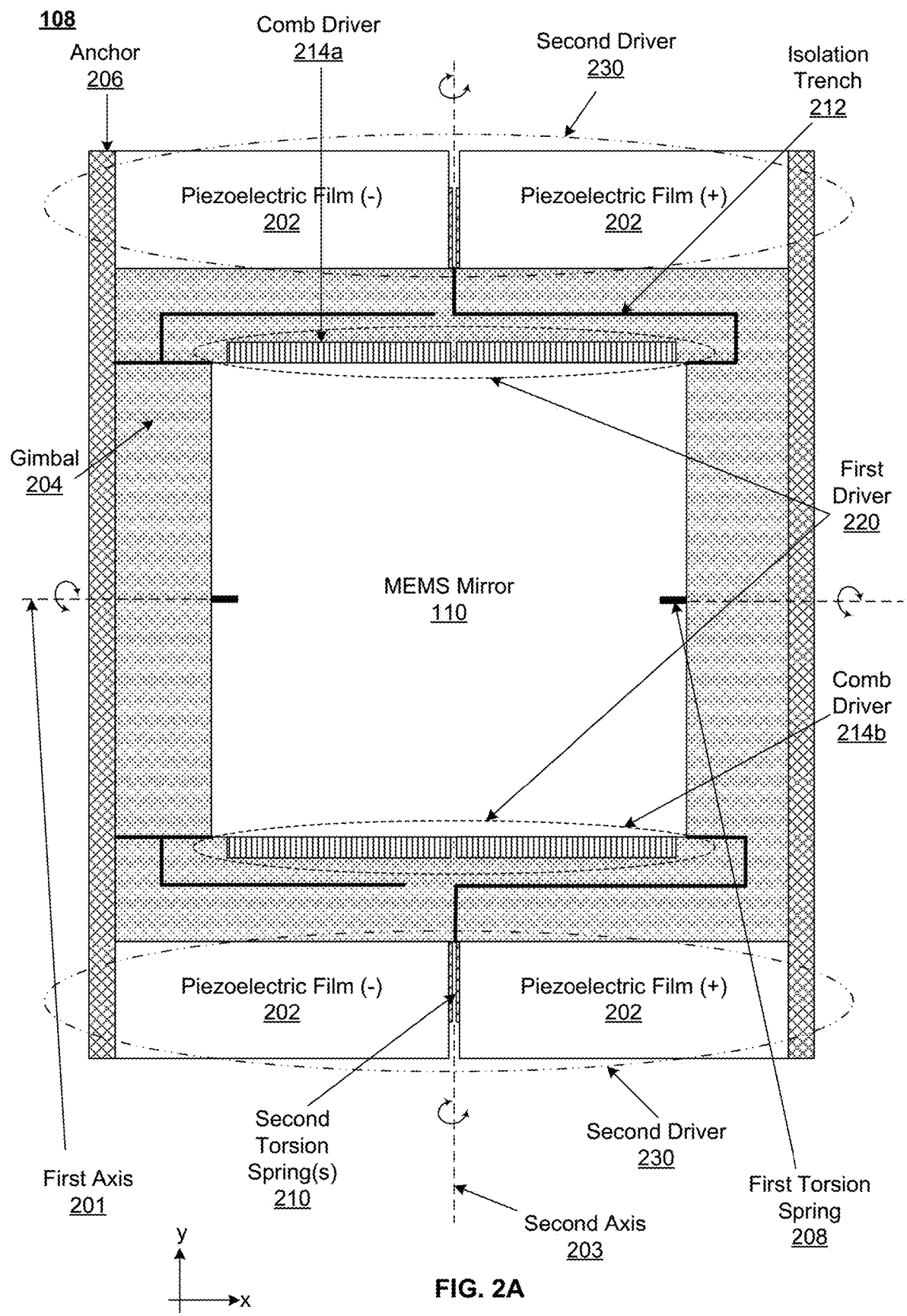
FIG. 2A illustrates a first diagram of an exemplary scanning mirror assembly, according to embodiments of the disclosure.
Figure 2B:
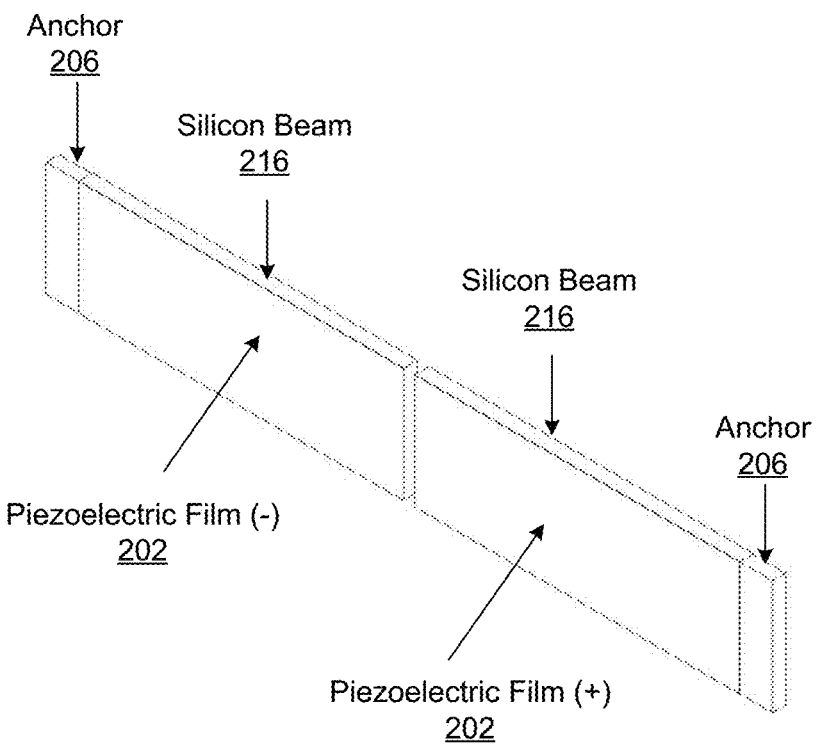
FIG. 2B illustrates a first diagram of an exemplary piezoelectric driver of the exemplary scanning mirror assembly of FIG. 1, according to embodiments of the disclosure.
Figure 2C:
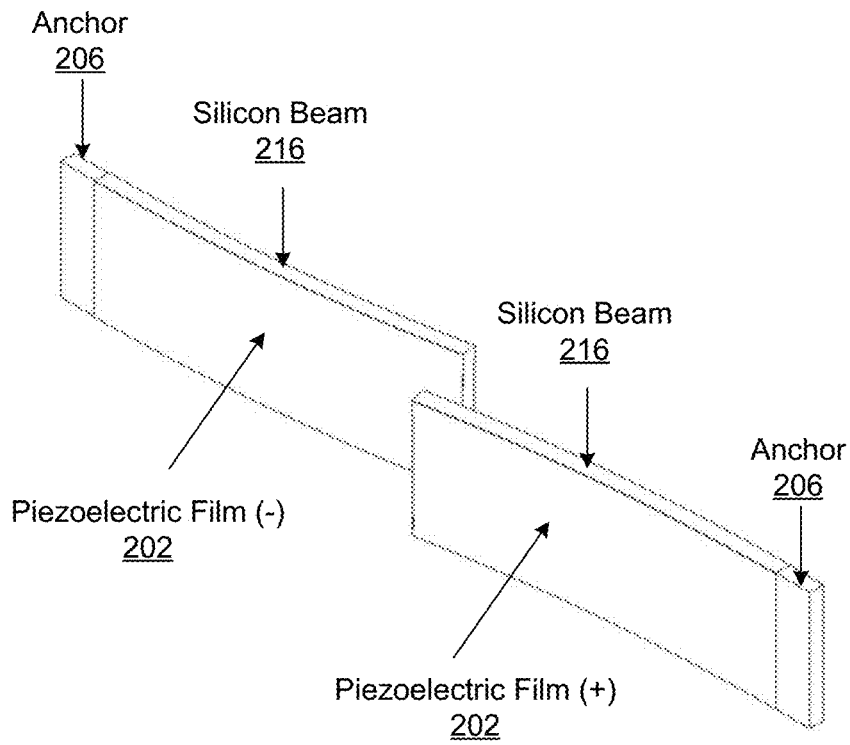
FIG. 2C illustrates a second diagram of the exemplary piezoelectric driver of the exemplary scanning mirror assembly of FIG. 1, according to embodiments of the disclosure.
Figure 2D:
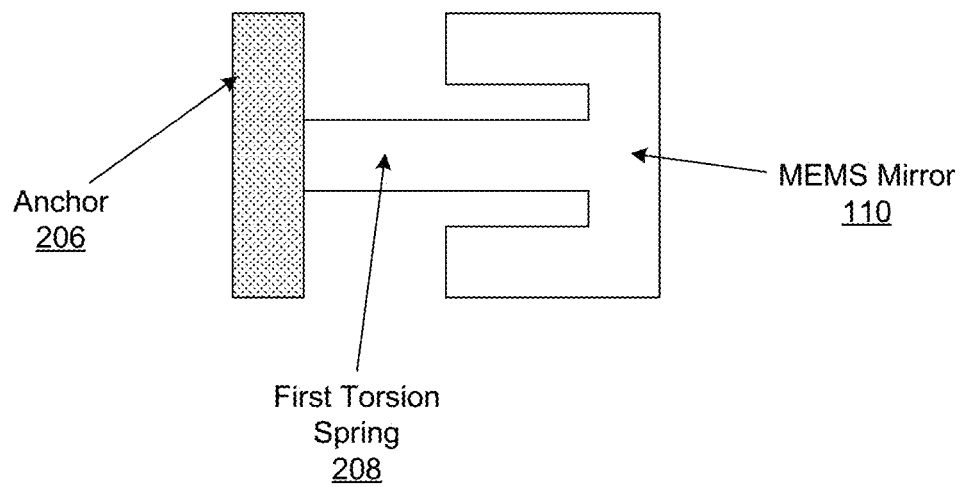
FIG. 2D illustrates a diagram of a first torsion spring associated with a first driver of the exemplary scanning mirror assembly of FIG. 1, according to embodiments of the disclosure.
Figure 2E:
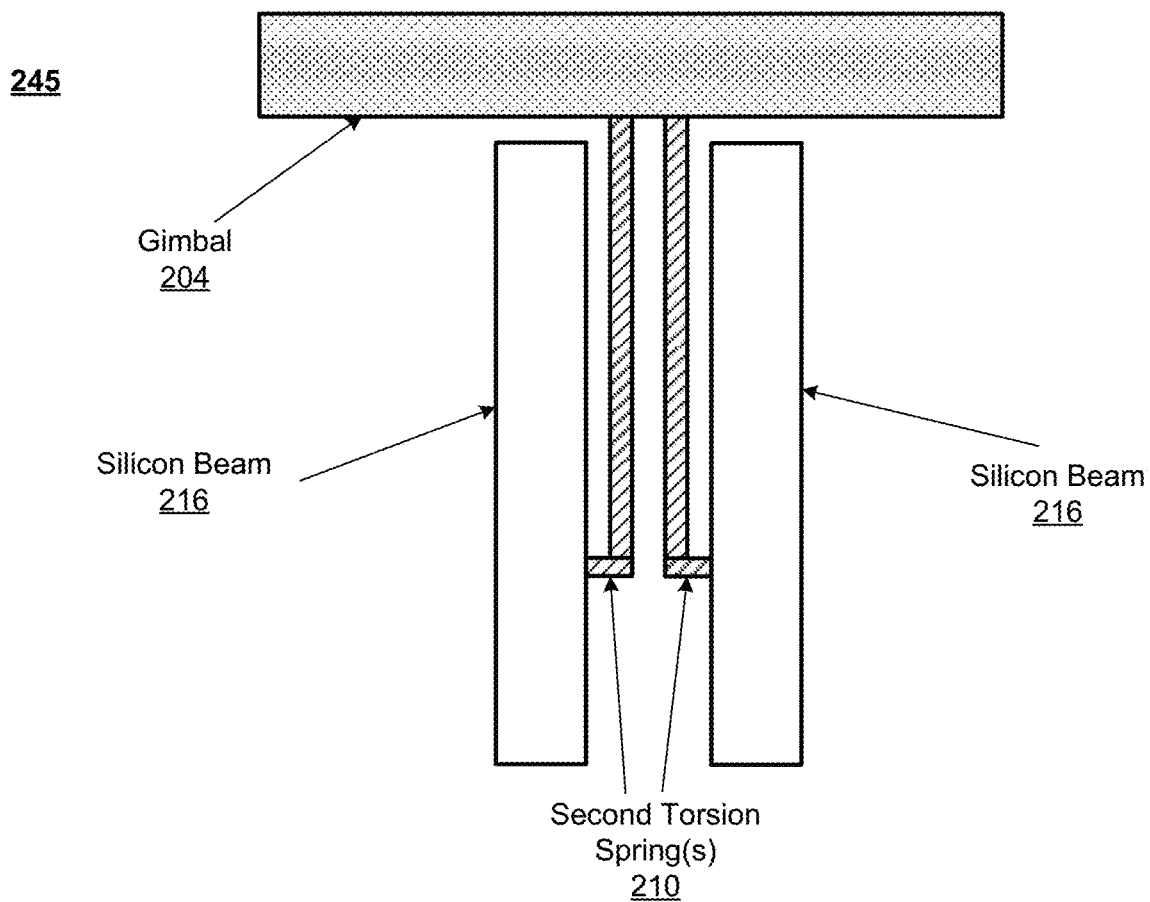
FIG. 2E illustrates a diagram of a second torsion spring associated with a second driver of the exemplary scanning mirror assembly of FIG. 1, according to embodiments of the disclosure.
Figure 2F:
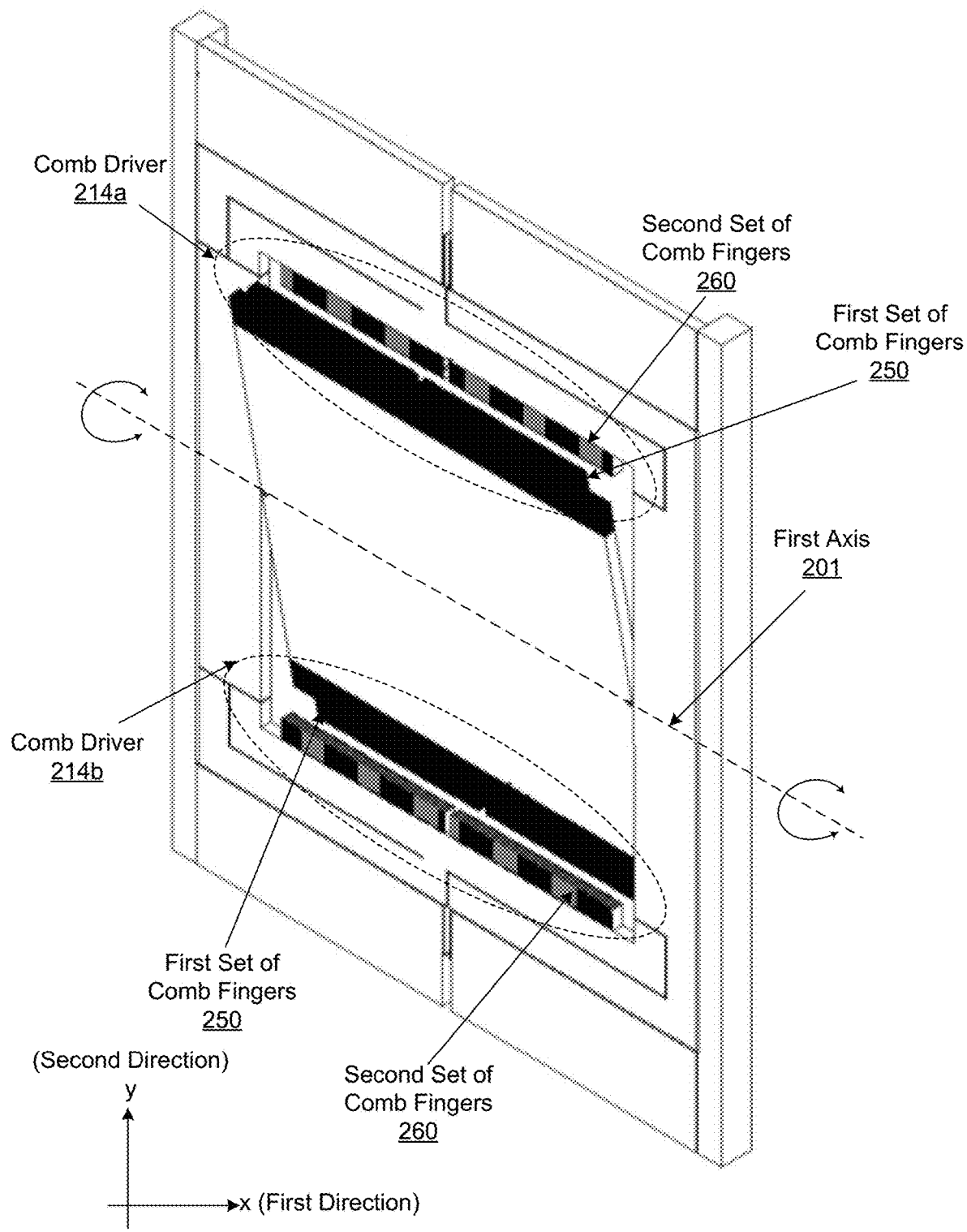
FIG. 2F illustrates a second diagram of an exemplary scanning mirror assembly, according to embodiments of the disclosure.
Figure 2G:
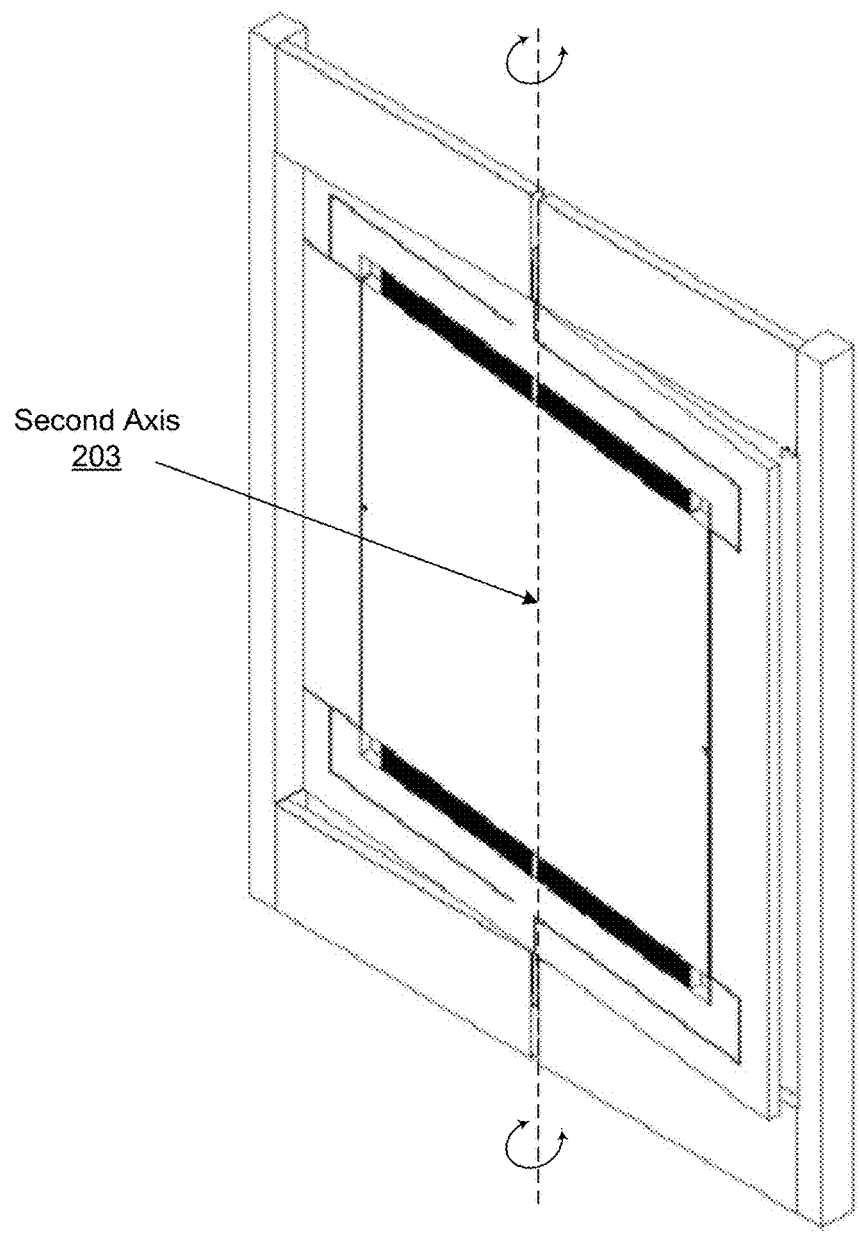
FIG. 2G illustrates a third diagram of an exemplary scanning mirror assembly, according to embodiments of the disclosure.
Figure 2G:
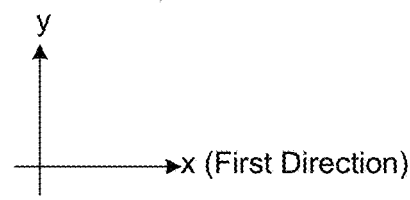
Figure 2H:
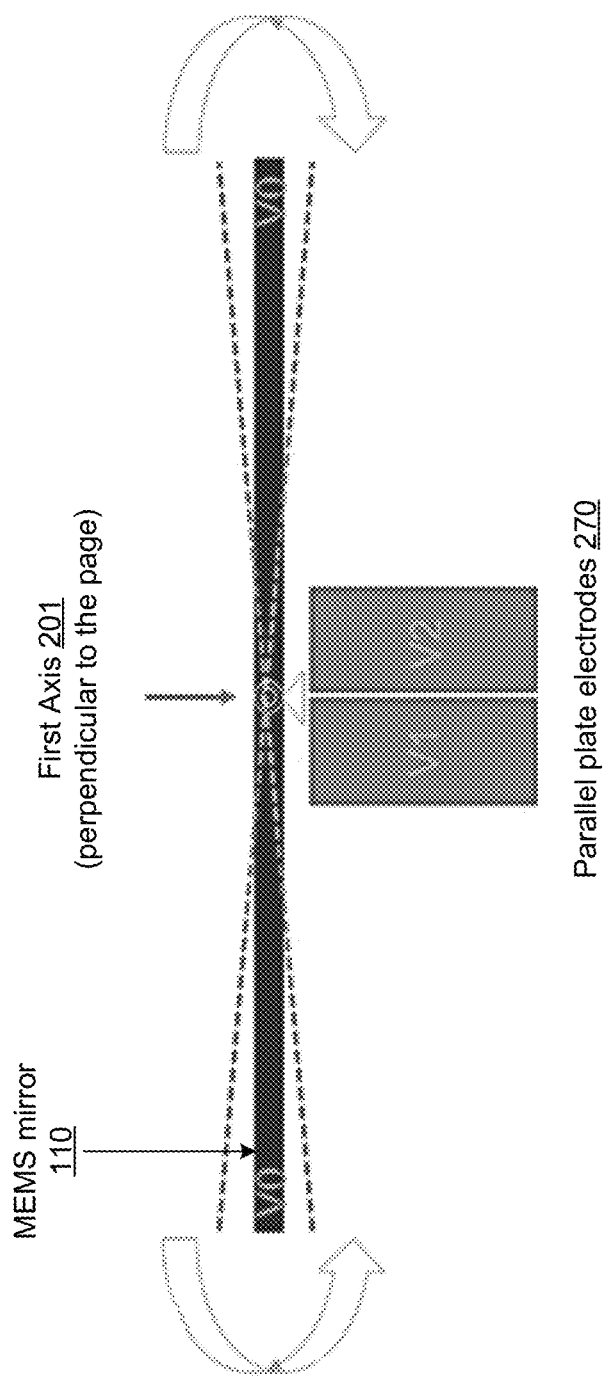
FIG. 2H illustrates a fourth diagram of an exemplary scanning mirror assembly, according to embodiments of the disclosure.

FIG. 2A illustrates a first detailed view of scanner 108 shown in FIG. 1, according to embodiments of the disclosure. FIG. 2B illustrates a first perspective view of an exemplary piezoelectric driver 215 compatible with scanner 108 shown in FIG. 1, according to embodiments of the disclosure. FIG. 2C illustrates a second perspective view of an exemplary piezoelectric driver 225 compatible with scanner 108 shown in FIG. 1, according to embodiments of the disclosure. FIG. 2D illustrates a detailed view of an exemplary torsion spring 235 associated with a first driver of the scanner, according to embodiments of the disclosure. FIG. 2E illustrates a detailed view of an exemplary torsion spring 245 associated with a second driver of the scanner, according to embodiments of the disclosure. FIG. 2F illustrates a second detailed view of scanner 108 shown in FIG. 1, according to embodiments of the disclosure. FIG. 2G illustrates a third detailed view of scanner 108 shown in FIG. 1, according to embodiments of the disclosure. FIG. 2H illustrates a fourth detailed view of scanner 108 shown in FIG. 1, according to embodiments of the disclosure. FIGS. 2A-2H will be described together.

Referring to FIG. 2A, scanner 108 may include a first driver 220 (e.g., an electrostatic driver) configured to drive the MEMS mirror 110 to rotate around a first axis 201. In certain example embodiments, such as the one illustrated in FIG. 2A, first driver 220 may include a pair of comb drivers 214a, 214b configured to oscillate the MEMS mirror 110 around the first axis at a first frequency. Assuming the natural frequency of MEMS mirror 110 is $\omega$, when first driver 220 drives MEMS mirror 110 at or near $2\omega$, the oscillation around first axis 201 may be sustained. More specifically, when MEMS mirror 110 is driven by the pair of comb drivers 214a, 214b, the drive frequency, which is the voltage frequency, is twice the natural frequency of the mirror. For example, if the natural frequency of MEMS mirror 110 is 5 kHz, a drive voltage of 10 kHz may be applied to the pair of comb drivers 214a, 214b, which may cause MEMS mirror 110 to oscillate at 5 kHz. First driver 220 can drive MEMS mirror 110 to oscillate at a relatively high frequency. By way of example and not limitation, MEMS mirror 110 may be driven to oscillate around first axis 201 at a first frequency, e.g., such as 1 kHz, 5 kHz, 10 kHz, 20 kHz, 100 kHz, etc.

As seen in FIG. 2F, comb drivers 214a, 214b may each include a first set of comb fingers 250 attached to the edges of MEMS mirror 110 and a second set of comb fingers 260 attached to gimbal 204. Additionally and/or alternatively, the second set of comb fingers 260 may be anchored to a substrate (not shown). During fabrication of scanner 108, MEMS mirror 110 and gimbal 204 may be formed simultaneously from the same silicon material. Hence, MEMS mirror 110 and gimbal 204 may be electrically isolated so that different voltages may be applied on first set of comb fingers 250 and second set of comb fingers 260. In some embodiments, an isolation trench 212 may be formed in gimbal 204 to electrically isolate MEMS mirror 110 and gimbal 204.

Assuming MEMS mirror 110 is biased at zero volts (e.g., V0=0), the first set of comb fingers 250 associated with both comb driver 214a and comb driver 214b may also be biased at zero volts. The second set of comb fingers 260 associated with comb driver 214a may be biased at V1 and the second set of comb fingers 260 associated with comb driver 214b may be biased at V2. In such a scenario, when the first and second sets of comb fingers 250, 260 are not perfectly aligned (e.g., when MEMS mirror 110 is not at its neutral position), an electrostatic force is created due to the voltage differentials between V0 and V1 or between V0 and V2, which pulls MEMS mirror 110 towards a neutral portion. In general, V1 and V2 are usually set to the same harmonically oscillating voltage. Depending on specific implementation, V1 and V2 can be up to or greater than 200 volts, for example.

While comb drivers are illustrated in FIG. 2A as an example of the first driver, it is contemplated that the first driver can be other types of electrostatic drivers or non-electrostatic solid-state drivers. In certain other example embodiments, as illustrated in FIG. 2H, first driver 220 may include a pair of parallel plate drive electrodes 270 configured to drive MEMS mirror 110 to oscillate around first axis 201. The pair of parallel plate drive electrodes 270 may be formed under MEMS mirror 110 on either side of first axis 201. Assuming MEMS mirror 110 is biased at zero volts (V0=0), a non-zero V1 applied to the parallel plate drive electrode 270 positioned to the left of the first axis 201 may pull MEMS mirror 110 down to the left. Similarly, a non-zero V2 applied to the parallel plate drive electrode 270 positioned to the right of the first axis 201 may pull MEMS mirror 110 down to the right. By applying out-of-phase sinusoidal driving voltages for V1 and V2, MEMS mirror 110 may oscillate around first axis 201 like a teeter totter. Using the parallel plate drive electrodes 270, MEMS mirror 110 may be operated at a frequency up to or greater than 10 kHz. In certain implementations, when first driver 220 includes parallel plate drive electrodes 270 rather than comb drivers 214a, 214b, isolation trench 212 may be omitted.

In either of the example embodiments of first driver 220, a pair of first torsion springs 208 may positioned along the first axis 201 and configured to facilitate rotation around first axis 201. As illustrated in FIG. 2D, each first torsion spring 208 may be coupled to one of the anchors 206 and MEMS mirror 110. First torsion spring 208 may have a spring constant that is implementation specific. Example spring constants for first torsion spring 208 may be as large as one Newton-meter (N*m). By way of example and not limitation, for a 4×12 mm$^2$ mirror, the torsion spring constant may be 0.04 N*m; for a 6×12 mm$^2$, the torsion spring constant may be 0.1 N*m; for a 10×15 mm$^2$, the torsion spring constant may be up to 1 N*m.

Referring again to FIG. 2A, scanner 108 may further include a second driver 230 (e.g., a piezoelectric driver) configured to drive MEMS mirror 110 to rotate around a second axis 203 using a converse piezoelectric effect when voltages are applied to the piezoelectric films 202. Piezoelectricity is the property of some materials (e.g., lead zirconate titanate (PZT), barium titanate, lead titanate, gallium nitride zinc oxide, etc.) to develop electric charge on their surface when mechanical stress is exerted on them. An applied electrical field produces a linearly proportional strain in these materials. The electrical response to mechanical stimulation is called the direct piezoelectric effect, and the mechanical response to electrical simulation is called the converse piezoelectric effect, which is the mechanism by which the second driver 230 drives MEMS mirror 110 to rotate around second axis 203.

Each piezoelectric film 202 has a plurality of minute interlocking crystal domains that have both positive and negative charges. When a voltage is applied to a piezoelectric film 202, an outer electrical field is generated that either stretches or compresses the crystal domains in the piezoelectric film 202 causing mechanical strain. As illustrated in FIGS. 2B and 2C, piezoelectric film 202 may be formed on an underlying silicon beam 216. When a voltage is applied across a piezoelectric film 202, the induced strain may cause a pushing (e.g., stretching) or pulling (e.g., compression) of the film depending on whether the voltage is positive or negative. The strain in piezoelectric films 202 may cause stretching and compression of the comparatively rigid silicon beams 216 on which they are formed, as illustrated in FIG. 2C. When voltage is not applied to the piezoelectric films 202, the piezoelectric film 202 and silicon beam 216 may remain in a neutral position, as illustrated in FIG. 2B. Although not shown, at least one electrode may be formed between each piezoelectric film 202 and silicon beam 216 and configured to apply the voltage to the piezoelectric films 202.

In the example embodiment illustrated in FIG. 2A, piezoelectric films 202 include two positive piezoelectric films (+) and two negative piezoelectric films (−). When voltages are appropriately applied to the piezoelectric films 202, the two negative piezoelectric films (−) may push the associated silicon beams 216 downward and the two positive piezoelectric films (+) may pull the associated silicon beams 216 upward. By applying sinusoidal driving voltages to adjacent piezoelectric films 202, MEMS mirror 110 may be driven to oscillate around second axis 203, as illustrated in FIG. 2G. As illustrated in FIG. 2E, a pair of second torsion springs 210 may be positioned on either side of the second axis 203 and couple silicon beams 216 to gimbal 204, such that both MEMS mirror 110 and gimbal 204 rotate around second axis 203.

Figure 3:
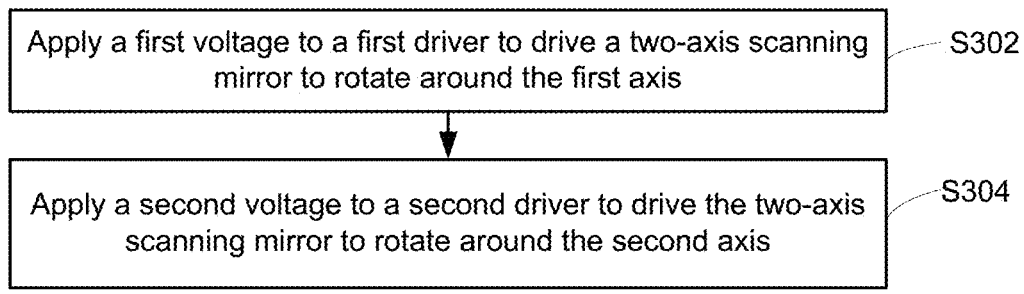
FIG. 3 illustrates a flow chart of an exemplary method for driving a scanning mirror to rotate about two axes simultaneously, according to embodiments of the disclosure.

FIG. 3 illustrates a flowchart of an exemplary scanning method 300 for an optical sensing system, according to embodiments of the disclosure. Method 300 may include steps S302 and S304 as described below. It is to be appreciated that some of the steps may be optional, and some of the steps may be performed simultaneously, or in a different order than shown in FIG. 3. Operations associated with method 300 may be performed by scanner 108, for example.

Referring to FIG. 3, at step S302, the scanner may drive a scanning mirror to oscillate around a first axis using a first driver. For example, referring to FIGS. 2A and 2F, a scanner 108 may include a first driver 220 (e.g., an electrostatic driver) configured to drive the MEMS mirror 110 to rotate around a first axis 201. In certain example embodiments, such as the one illustrated in FIG. 2A, first driver 220 may include a pair of comb drivers 214a, 214b configured to oscillate the MEMS mirror 110 around the first axis at a first frequency. Assuming the natural frequency of MEMS mirror 110 is ω, when first driver 220 drives MEMS mirror 110 at or near 2ω, the oscillation around first axis 201 may be sustained. More specifically, when MEMS mirror 110 is driven by the pair of comb drivers 214a, 214b, the drive frequency, which is the voltage frequency, is twice the natural frequency of the mirror. For example, if the natural frequency of MEMS mirror 110 is 5 kHz, a drive voltage of 10 kHz frequency may be applied to the pair of comb drivers 214a, 214b, which may cause MEMS mirror 110 to oscillate at 5 kHz. First driver 220 can drive MEMS mirror 110 to oscillate at a relatively high frequency. By way of example and not limitation, MEMS mirror 110 may be driven to oscillate around first axis 201 at a first frequency, e.g., such as 1 kHz, 5 kHz, 10 kHz, 20 kHz, 100 kHz, etc. As seen in FIG. 2F, Assuming MEMS mirror 110 is biased at zero volts (e.g., V0=0), the first set of comb fingers 250 associated with both comb driver 214a and comb driver 214b may also be biased at zero volts. The second set of comb fingers 260 associated with comb driver 214a may be biased at V1 and the second set of comb fingers 260 associated with comb driver 214b may be biased at V2. In such a scenario, when the first and second sets of comb fingers 250, 260 are not perfectly aligned (e.g., when MEMS mirror 110 is not at its neutral position), an electrostatic force is created due to the voltage differentials between V0 and V1 or between V0 and V2, which pulls MEMS mirror 110 towards a neutral portion. In general, V1 and V2 may be set to the same harmonically oscillating voltage. Depending on specific implementation, V1 and V2 can be up to or greater than 200 volts, for example. In certain other example embodiments, not illustrated in FIG. 2A, rather than using comb drivers, the first driver 220 may include a pair of parallel plate drive electrodes 270 configured to drive MEMS mirror 110 to oscillate around first axis 201. The pair of parallel plate drive electrodes 270 may be formed under MEMS mirror 110 on either side of first axis 201. Assuming MEMS mirror 110 is biased at zero volts (V0=0), a non-zero V1 applied to the parallel plate drive electrode positioned to the left of the first axis 201 may pull MEMS mirror 110 down to the left. Similarly, a non-zero V2 applied to the parallel plate drive electrode positioned to the right of the first axis 201 may pull MEMS mirror 110 down to the right. By applying out-of-phase sinusoidal driving voltages for V1 and V2, MEMS mirror 110 may oscillate around first axis 201 like a teeter totter. Using the parallel plate drive electrodes, MEMS mirror 110 may be operated at a frequency up to or greater than 10 kHz.

At step S304, the scanner may drive the scanning mirror to simultaneously oscillate around a second axis using a second driver. For example, referring to FIGS. 2A-2C and 2G, scanner 108 may include a second driver 230 (e.g., a piezoelectric driver) configured to drive MEMS mirror 110 to rotate around a second axis 203 using a converse piezoelectric effect when voltages are applied to the piezoelectric films 202. When a voltage is applied to a piezoelectric film 202, an outer electrical field is generated that either stretches or compresses a plurality of minute interlocking crystal domains in the piezoelectric film 202 causing mechanical strain. As illustrated in FIGS. 2B and 2C, piezoelectric film 202 may be formed on an underlying silicon beam 216. When a voltage is applied across a piezoelectric film 202, the induced strain may cause a pushing (e.g., stretching) or pulling (e.g., compression) of the film depending on whether the voltage is positive or negative. The strain in piezoelectric films 202 may cause stretching and compression of the comparatively rigid silicon beams 216 on which they are formed, as illustrated in FIG. 2C. When voltage is not applied to the piezoelectric films 202, the piezoelectric film 202 and silicon beam 216 may remain in a neutral position, as illustrated in FIG. 2B. In the example embodiment illustrated in FIG. 2A, piezoelectric films 202 include two positive piezoelectric films (+) and two negative piezoelectric films (−). When voltages are appropriately applied to the piezoelectric films 202, the two negative piezoelectric films (−) may push the associated silicon beams 216 downward and the two positive piezoelectric films (+) may pull the associated silicon beams 216 upward. By applying sinusoidal driving voltages to adjacent piezoelectric films 202, MEMS mirror 110 may be driven to oscillate around second axis 203, as illustrated in FIG. 2G.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

What is claimed is:

1. A scanner for steering optical beams, comprising:
a scanning mirror independently rotatable around a first axis and a second axis;
a first driver that is an electrostatic driver configured to drive the scanning mirror to rotate around the first axis at a first frequency that is twice a natural oscillation frequency of the scanning mirror;
a gimbal connected to the electrostatic driver, wherein the scanning mirror and the gimbal are simultaneously formed from a same silicon material; and
a second driver that is a piezoelectric driver configured to drive the scanning mirror to simultaneously rotate around the second axis.

2. The scanner of claim 1, wherein the scanning mirror, the first driver, and the second driver are formed on single crystal silicon.

3. The scanner of claim 1, wherein:
the piezoelectric driver is configured to oscillate the scanning mirror around the second axis at a second frequency, and
the first frequency is higher than the second frequency.

4. The scanner of claim 1, wherein:
the electrostatic driver comprises a pair of parallel plate drive electrodes configured to alternately pull or push sides of the scanning mirror, or
the electrostatic driver comprises a pair of comb drivers attached to opposite edges of the scanning mirror.

5. The scanner of claim 1, wherein the electrostatic driver is configured to oscillate the scanning mirror around the first axis by an application of a driving voltage with a sinusoidal waveform.

6. The scanner of claim 4, wherein a first set of comb fingers of each comb driver are attached to the gimbal and a second set of comb fingers of each comb driver are attached to the scanning mirror.

7. The scanner of claim 6, further comprising:
an isolation trench formed in the gimbal and configured to electrically isolate the scanning mirror from the gimbal.

8. The scanner of claim 6, wherein the piezoelectric driver includes a plurality of piezoelectric films formed on a portion of a silicon beam adjacent to the gimbal.

9. The scanner of claim 8, further comprising:
a plurality of anchors;
at least one first torsion spring positioned along the first axis; and
at least one second torsion spring positioned along the second axis,
wherein the at least one first torsion spring is coupled to at least one of the plurality of anchors and the scanning mirror, and
wherein the at least one second torsion spring is coupled to the silicon beam and a gimbal.

10. The scanner of claim 8, wherein:
the piezoelectric driver includes a plurality of electrodes each formed between a corresponding one of the plurality of piezoelectric films and the silicon beam, and
the plurality of electrodes are configured to apply a potential to the plurality of piezoelectric films.

11. The scanner of claim 8, wherein the plurality of piezoelectric films are zirconate titanate (PZT) films.

12. A transmitter for an optical sensing system, comprising:
a light source configured to emit a light beam; and
a scanner for steering the light beam towards an object, the scanner comprising:
a scanning mirror independently rotatable around a first axis and a second axis;
a first driver that is an electrostatic driver configured to drive the scanning mirror to rotate around the first axis at a first frequency that is twice a natural oscillation frequency of the scanning mirror;
a gimbal connected to the electrostatic driver, wherein the scanning mirror and the gimbal are simultaneously formed from a same silicon material; and a second driver that is a piezoelectric driver configured to drive the scanning mirror to simultaneously rotate around the second axis.

13. The transmitter of claim 12, wherein the scanning mirror, the first driver, and the second driver are formed on a single crystal silicon.

14. The transmitter of claim 12, wherein:
the piezoelectric driver is configured to oscillate the scanning mirror at a second frequency, and
the first frequency is higher than the second frequency.

15. The transmitter of claim 14, wherein a first portion of the electrostatic driver is attached to the gimbal and a
second portion of the electrostatic driver is attached to the scanning mirror.

16. The transmitter of claim 15, wherein the scanner further comprises:
an isolation trench formed in the gimbal and configured to electrically isolate the first portion of the electrostatic driver and the second portion of the electrostatic driver.

17. A scanning method of an optical sensing system, comprising:
driving a scanning mirror to oscillate around a first axis using a first driver that is an electrostatic driver at a first frequency that is twice a natural oscillation frequency of the scanning mirror, wherein the first driver that is an electrostatic driver is connected to a gimbal and the gimbal and the scanning mirror are simultaneously formed from a same silicon material; and
driving the scanning mirror to simultaneously oscillate around a second axis using a second driver that is a piezoelectric driver,
wherein the scanning mirror, the first driver, and the second driver are formed on a single crystal silicon.

* * * * *